(12) United States Patent
Lin et al.

(10) Patent No.: US 6,393,139 B1
(45) Date of Patent: May 21, 2002

(54) SEQUENCE-ENCODED MULTIPLE BIOMETRIC TEMPLATE SECURITY SYSTEM

(75) Inventors: Min-Hsiung Lin, Saratoga; Shu Gao, Irvine; Kung-Shiuh Huang, Orange; Jian-Ming Wang, Irvine, all of CA (US)

(73) Assignee: Xirlink, Inc., San Jose, CA (US)

( * ) Notice: Subject to any disclaimer, the term of this patent is extended or adjusted under 35 U.S.C. 154(b) by 0 days.

(21) Appl. No.: 09/255,964

(22) Filed: Feb. 23, 1999

(51) Int. Cl.$^7$ ................................................ G06K 9/00
(52) U.S. Cl. ........................................ 382/124; 382/125
(58) Field of Search ................................. 382/123, 124, 382/125, 126, 127, 115, 116, 118; 704/275, 273, 270; 340/825.31, 825.34

(56) References Cited

U.S. PATENT DOCUMENTS

| | | | |
|---|---|---|---|
| 5,719,950 A | * 2/1998 | Osten et al. | ................ 382/115 |
| 5,838,306 A | 11/1998 | O'Connor et al. | |
| 5,848,176 A | * 12/1998 | Hara et al. | .................... 382/124 |
| 6,072,891 A | * 6/2000 | Hamid et al. | ................ 382/116 |
| 6,160,903 A | * 12/2000 | Hamid et al. | ................ 382/115 |

* cited by examiner

*Primary Examiner*—Andrew W. Johns
*Assistant Examiner*—Seyed Azarian
(74) *Attorney, Agent, or Firm*—Skjerven Morrill MacPherson LLP

(57) ABSTRACT

A security access method and/or apparatus is disclosed in the present invention. The present invention discloses a security method that verifies both the user's fingerprints and the fingerprint entering sequence to determine whether an access can be authorized. By using both the fingerprints and the entering sequence as the access criteria, a highly secured device can be created using low cost commercial available components.

21 Claims, 3 Drawing Sheets

APPLICATION ACCESS REQUIREMENT TABLE

APPLICATION 1
   USER 1
    --- APPLICATION USER ID
    --- ACCESS REQUIREMENT SEQUENCE: L1, R1, L1
   USER 2
   .
   .
   USER N
APPLICATION 2
   .
   .
APPLICATION n

SEQUENCE-ENCODED MULTIPLE BIOMETRIC TEMPLATE SECURITY SYSTEM

BACKGROUND OF THE INVENTION

The present invention relates to a method and/or an apparatus of securing an application, and more particularly to an individual identification apparatus.

An optical pattern recognition technique can be applied, for example, to an individual secured device. The individual secured device is provided for identifying a person under investigation with a specific individual on record. The person under investigation will be referred to as an arbitrary person, hereinafter. The individual secured device generally detects a portion of the body of the arbitrary person. For example, an optical fingerprint identification apparatus has been proposed for detecting fingerprints of the arbitrary person and the specific person.

An optical fingerprint identification secured device has been developed for detecting ending or bifurcation points of ridge lines (i.e. minutiae) of a fingerprint of a specific person and of a fingerprint of an arbitrary person. More specifically, this device detects positions of ending or bifurcation points of the ridge lines, as a match or a mismatch, the fingerprints of the arbitrary person and the specific person. This device is known for being capable of high precision identification. However, this apparatus is disadvantageous in that extracting the characteristics of the minutiae requires a great amount of time, and also, the apparatus has a large scale.

Conventionally, in order to gain access to the secured device, the individual person is requested to submit all his fingers for fingerprint recognition by the device. The device might comprise an integral Charge-Coupled Imaging Device (CCD), and a light source coupled with data encoder, decoder and other exemplary processing circuitry for capturing the fingerprints. Charge-Coupled Imaging Devices are well known in the art and generally include an MOS capacitor with an electrode attached on top of silicon dioxide on a semiconductor substrate surface. When voltage is applied between the electrode and the substrate, a depletion layer is formed at the silicon dioxide and the semiconductor interface, resulting in a potential well of low energy ranking of the minority carrier. If the signal charge generated by light radiation is injected into this potential well, the signals are temporarily stored and memorized as analog qualities.

In general, the CCD elements are arranged in a matrix comprising a light sensitive CCD device upon which an image of a fingerprint is projected. Each individual fingerprint signature signal will be analyzed and processed as hereinafter explained. The CCD array operates as an analog shift register to obtain and transfer out pixels of information defining the fingerprint signature projected thereon. It is noted that many other sensing arrangements may be substituted for the CCD device shown herein to provide a fingerprint "signature" for comparison with approved fingerprints signatures.

Another method of achieving high accuracy of identifying an arbitrary person is disclosed by U.S. Pat. No. 5,719,950, issued to Osten et al. (hereinafter "Osten"). Osten discloses a biometric authentication system employing a combination of fingerprints and at least one non-specific biometric parameter of a physiological characteristic recognized and compared with physiological norms. The non-specific biometric parameter is used as a second security parameter for ensuring that the arbitrary individual is not incapacitated, dismembered, or deceased. However, this method is very complex in design and requires additional sensors and logic circuit to control the logic. Thus, it tremendously increases the costs of the system.

SUMMARY OF THE INVENTION

It is therefore an object of the present invention to overcome the above-described drawbacks, and to provide a secured device which can have high tolerance in regards to the quality of the images of the body portions of the arbitrary person and the specific person, and also can perform quick and easy identification of individuals.

It is another object to provide a highly secure system employing relatively low resolution fingerprint recognition components.

The present invention discloses a security access method and/or device. The security access method verifies both the intended user's fingerprints and the fingerprint entering sequence to determine whether an access should be authorized. By using both the fingerprints and the entering sequence as the access criteria, a highly secured device can be created using low cost commercially available components.

These and other objects and features of the invention will be better understood by reference to the detailed description which follows taken together with the drawings in which like elements are referred to by like designations throughout the several views.

DETAILED DESCRIPTION OF THE DRAWINGS

Figures 1, 2:
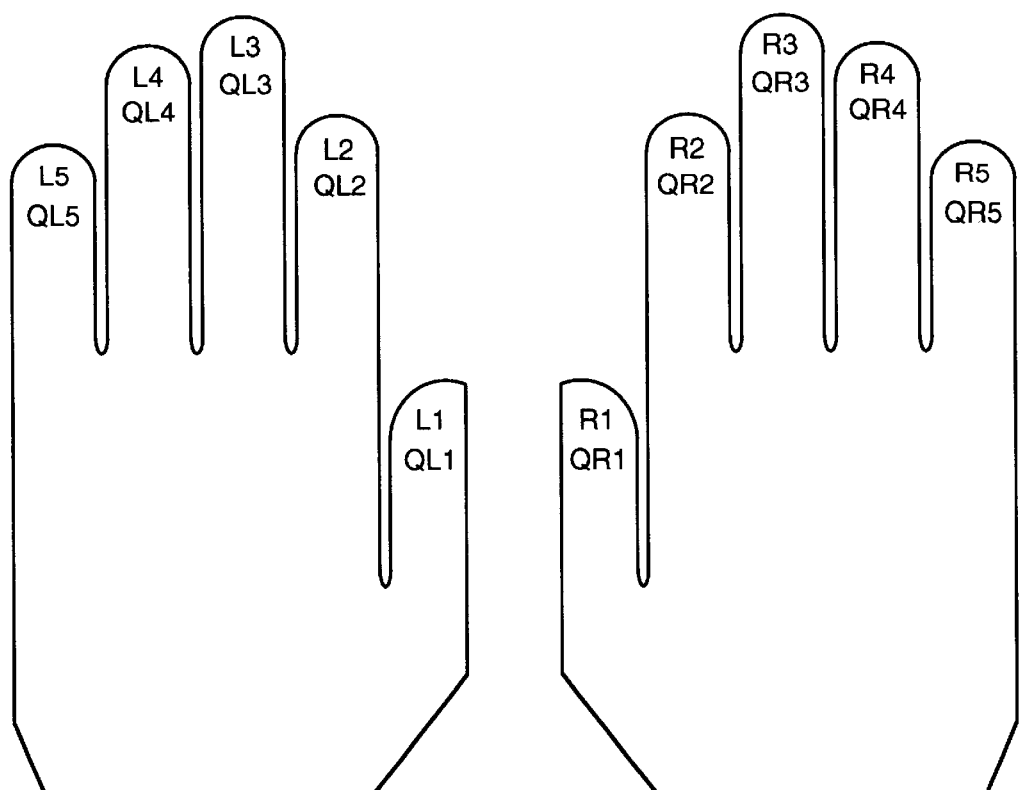
FIG. 1 shows two palms of a human user each having five fingers.
FIG. 2 shows a fingerprint/biometric registration table according to a preferred embodiment of the present invention.

The present invention discloses a simple and highly secured method of guarding access to a secured device. The secured device can be a computer system, an automatic teller machine, an application software, or accesses to a file system. According to the present invention, the secured device employs a security screening procedure using a combination of fingerprints and fingerprint entering sequence to determine the validity of an user input. By verifying both the fingerprints entered and the fingerprint entering sequence, the present identification apparatus is able to achieve high security while using simple commercially available components.

According to the present invention, the preferred embodiment of the security method comprises two steps: The first step is the enrollment, and the second step is the verification.

In the enrollment step, the secured device first recognizes and stores the fingerprint patterns of the intended user. The intended user then provides the secured device with a selected fingerprint entering sequence.

After both the fingerprints and the entering sequence are provided and stored by the secured device, the secured device is then "secured." When the user wants to access the secured device, the verification step is then invoked to determine whether the user has the authorization to access the secured device. In the verification step, the user is required to produce fingerprints for comparison with the selected fingerprint entering sequence. When each of the fingerprints is verified and validated with the fingerprint entering sequence, access will be granted to the user. On the other hand, if any of the fingerprints entered do not match its pre-stored fingerprint or the sequence of the fingerprints entered does not match the pre-stored fingerprint entering sequence, the secured device will deny access to the user. It should be noted that even if each of the fingerprints entered matches the fingerprints of the user stored in the device, the secured device will still deny access from the user when the entering sequence (or validating sequence) is different from the pre-stored fingerprint entering sequence.

By verifying both the fingerprints entered and the sequence of entering, the present invention greatly increases the security of the secured device. It should be noted that the advantage of the present invention is the ability to use simple, and inexpensive, fingerprint recognition components to achieve highly discriminating results. And, hence, tremendous cost savings from the secured devices can be achieved.

The following describes in detail the two steps (i.e. enrollment and verification) according to a preferred embodiment of the present invention:

1. Enrollment

According to the present invention, the enrollment step performs two functions: The first function is for the secured device to recognize all, or at least a major portion of, the fingerprints of the authorized user. The second function is to allow the user to program a secret fingerprint entering sequence into the secured device for establishing an additional security parameter.

According to the preferred embodiment of the present invention, each human finger is assigned a symbol. FIG. 1 shows two palms each having five fingers. As shown in the figure, the fingers on the left hand are designated as L1, L2, L3, L4 & L5, whereas the fingers on the right hand are designated as R1, R2, R3, R4 & R5. Specifically, L1 denotes the left thumb, L2 denotes the left index finger, L3 denotes the left middle finger, L4 denotes the left ring finger, and L5 denotes the left pinky. Similarly, R1 denotes the right thumb, R2 denotes the right index finger, R3 denotes the right middle finger, R4 denotes the right ring finger, and R5 denotes the right pinky.

In the enrollment step of the preferred embodiment, the user is first assigned with a User ID. Then the user is required to provide all, or a major portion of, his fingers to the secured device for fingerprint recognition. A fingerprint capturing system such as Xirlink (TM) C-it ID device is used for capturing all the fingerprints provided. Using the captured fingerprint images, the device then calculates a quality measure of each fingerprint of the user. In the preferred embodiment, the quality measure of each fingerprint represents the quality of the fingerprint recognized, and the ability for future comparisons with any fingerprints input. In addition, this number assists the user to select a best possible fingerprint entering sequence so that a highest combined quality measure of all fingerprints in the entering sequence can be achieved.

After the secured device analyzes and determines the quality of each of the fingerprints entered, the device generates a record for the user in the fingerprint/biometric registration table as shown in FIG. 2. As shown in FIG. 2, the fingerprint/biometric registration table comprises a plurality of records. Each of the records in the registration table corresponds to an authorized user. Each record preferably comprises a fingerprint entry for each finger of the user. As shown in the figure, each fingerprint entry of the user comprises a minutia portion and a quality score portion. Specifically, the minutia portion of the fingerprint entry represents the unique identification features of each finger, whereas the quality score portion comprises the quality measure of the corresponding finger representing the fingerprint quality of that specific finger.

In the preferred embodiment of the present invention, the secured device then displays the list of quality measures to the user so that the user can either re-enter some or all of the fingerprints into the device, or selects a fingerprint entering sequence based on the quality measure displayed. Particularly, using the quality measure of each finger, the user can select the appropriate entering sequence that has the highest combined quality measure score.

After the list of the quality measures is displayed to the user, the user can enter his selected fingerprint entering sequence into the secured device by pressing the corresponding fingerprints according to his selected sequence to the secured device. Another way of entering the selected fingerprint entering sequence is by pressing a sequence of buttons (such as keypad, or keyboard) located in the secured device.

For example, if the user choose a sequence: "L1 R1 L1" for an application. This means the user must enter the following fingerprint entering sequence in order to gain access to the device: left thumb, right thumb and left thumb.

Figures 3, 4:
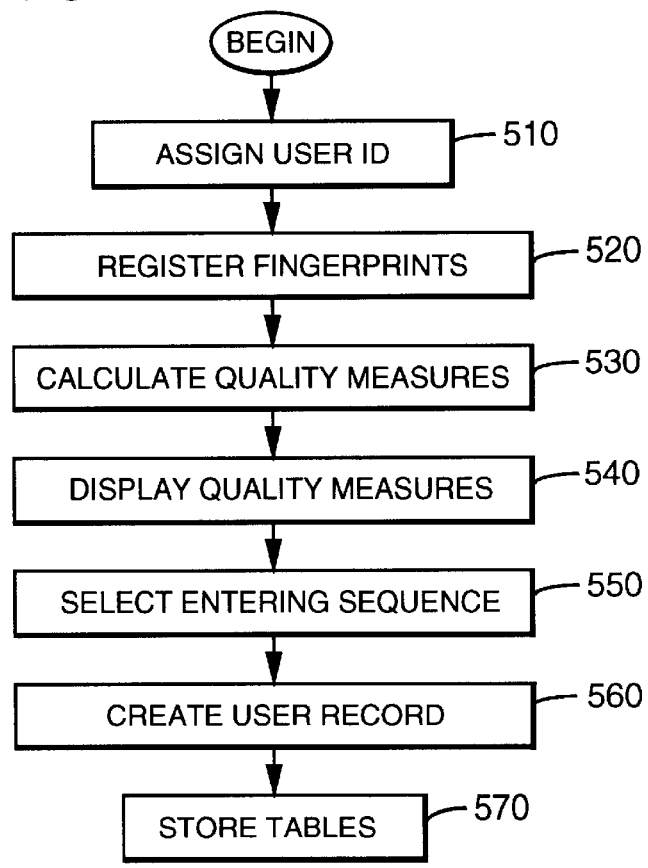
FIG. 3 shows an application access requirement table according to a preferred embodiment of the present invention.
FIG. 4 is a flow chart showing the enrollment process according to the present invention.

After the selected fingerprint entering sequence is entered into the secured device, the secured device then creates a record in an application access requirement table as shown in FIG. 3. According to the present invention, the application access requirement table comprises a plurality of records. Each of the records represents one application. As described in previous paragraphs, each application can represent either a file, an application program, or a machine such as ATM, or laptop computer, etc.

According to this embodiment, each application allows multiple user access. Thus, as shown in the figure, each record comprises a plurality of user records. Each user record comprises an application user Id for identifying the user (e.g. the use of the application user ID is similar to the login ID for any secured application), and an access requirement sequence for that particular user. The access requirement sequence represents the fingerprint entering sequence using the finger symbols as shown in FIG. 1. In the example as shown in FIG. 3, application 1 has n authorized users: user 1, user 2, . . . user n. Particularly, as shown in the figure, user 1 has selected a fingerprint entering sequence of: L1 (i.e. left thumb), R1 (i.e. right thumb), and L1 (i.e. left thumb again).

After the application access requirement table is updated, the enrollment step according to the present invention is completed.

2. Verification

In the preferred embodiment, a verification step is performed in the secured device to screen user accesses to the device. The verification step is as follows:

When an user wants to gain access to any application (e.g. file, program, or machine), the user is required to first input his User ID into the device so that the corresponding user record located in the application access requirement table can be retrieved for verification.

After the User ID is entered into the secured device, the user will then need to submit his fingers for fingerprint recognition according to the fingerprint entering sequence selected in the enrollment step. Each fingerprint entered by the user is then recognized by the secured device and converted into machine-readable data for comparison. This data for each fingerprint entered is then compared with the verification parameters (e.g. minutiae) of the corresponding fingerprint defined in the access requirement sequence of that specific user. It should be noted that the verification parameters of each fingerprint of the user are obtained from the fingerprint registration table as shown in FIG. 2. When each of the fingerprints entered matches the corresponding fingerprint defined in the access requirement sequence of the user record, the user is allowed to access the application. Otherwise, the access to the application will be denied.

It should be noted that, in this preferred embodiment, the device is not required to explicitly check the fingerprint input sequence with the access requirement sequence stored in the device. Since each of the fingerprints entered is checked with the corresponding fingerprint identified by the access requirement sequence, the fingerprint input sequence is implicitly being matched with the access requirement sequence during the entering of the fingerprints in the verification step.

In the preferred embodiment of the present invention, both fingerprint registration table and the application access requirement table are encrypted and can only be decrypted by the computer administration with a master key/password.

Furthermore, this invention can be used with all biometric security systems and applied to multiple biometric templates; combination of different biometric templates (e.g. sequence of iris and/or facial and/or fingerprint templates) can be used during the enrollment and verification procedure. For example, if the user choose a sequence: "L1 F R1" for an application. This means that the user must enter his/her biometric templates in the following sequence in order to gain access to the device: the left thumb fingerprint template (L1), the facial template (F), and then the right iris template (R1).

FIG. 4 is a flow chart showing the enrollment process according to the present invention.

The user is first assigned with a user ID (Step 510). Then the user is required to register all, or at least a major portion of, his/her fingerprints into the secured device (Step 520). The fingerprints can be registered to the secured device one by one. Or in some other embodiments, all the fingers can be input to the device as shown in FIG. 1 so that the device can analyze and correspond each input fingerprint to its corresponding finger. After all the user's fingers are registered with the secured device, the quality measure of each fingerprint is calculated (Step 530). As discussed in the previous paragraphs, the quality measure of each finger is calculated by a fingerprint recognition software to represent the fingerprint quality of the finger scanned in the device. Particularly, the quality measure provides information to the user about the quality of the fingerprints scanned in the device so that the user can select a fingerprint entering sequence that can provide a highest combined quality measure of all fingerprints entered. After the list of the quality measures are displayed to the user (Step 540), the user can enter his fingerprints into the device according to his selected fingerprint entering sequence (Step 550). The secured device recognizes each of the fingerprints entered and determines the selected fingerprint entering sequence entered by the user. Using the selected fingerprint entering sequence, the device then creates a user record in the fingerprint registration table and a record in the application access requirement table (Step 560) These two tables (i.e. fingerprint registration table and the application access requirement table) are illustrated in FIG. 2 and FIG. 3. As described above, both of the fingerprint registration table and the application access requirement table can be encrypted or password protected and stored in the apparatus (Step 570).

Figure 5:
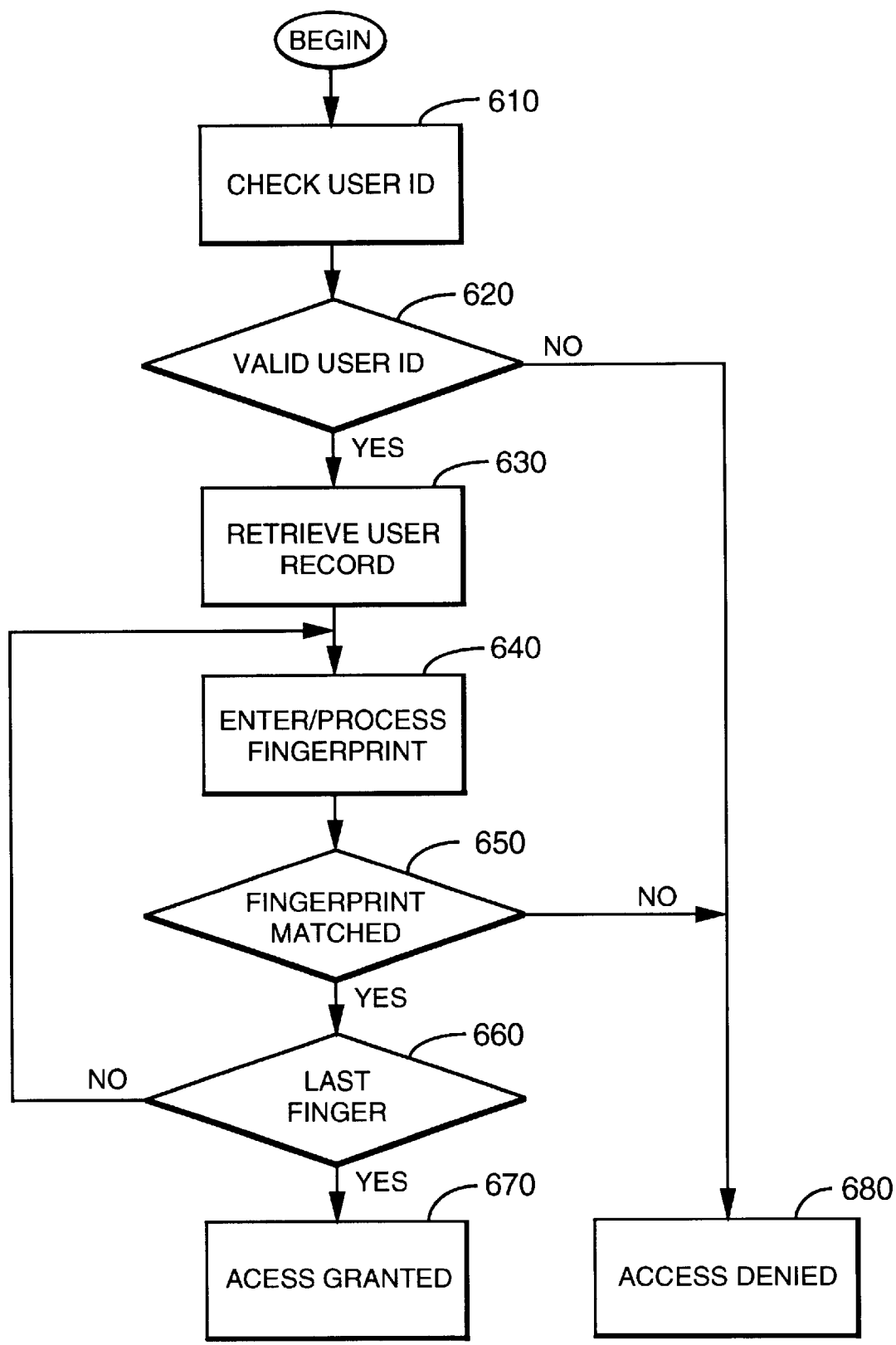
FIG. 5 is a flow chart showing the validating process according to the present invention.

FIG. 5 is a flow chart showing the validating process according to the present invention.

When an user wants to access the secured device, the user first needs to enter his User ID to the device (Step 610). If the User ID entered does not match any of the authorized user of that application (Step 620), access to the application will be denied (Step 680). Otherwise, the corresponding record of the user is retrieved from the application access table (Step 630). Then, the corresponding fingerprint parameters (e.g. minutiae) of each individual fingerprint defined in the access requirement sequence is retrieved from the user record in the fingerprint registration table (Step 630). Then the user is requested to enter a validation sequence of his fingerprints into the secured device to match the pre-stored fingerprint entering sequence. The device analyzes and recognizes each fingerprint entered (Step 640). After each fingerprint is recognized, the parameter (e.g. minutiae) of the fingerprint entered is compared with the parameter of the fingerprint in the corresponding position of the fingerprint entering sequence stored in the application access requirement table (Step 640). When any of the fingerprints does not match the fingerprint in the corresponding position of the entering sequence (Step 650), access to the secured device will be denied (Step 680). When all fingerprints entered match the parameters and the position of the fingerprint defined in the entering sequence, access to the application will be granted (Step 660).

It is to be understood that while the invention has been described above in conjunction with preferred specific embodiments, the description and examples are intended to illustrate and not limit the scope of the invention, which is defined by the scope of the appended claims.

What is claimed is:

1. A method of screening access for a security protected device, comprising:

accepting a plurality of fingerprints, wherein said plurality of fingerprints are entered into the security protected device according to an input sequence;

validating each of the fingerprints;

validating the input sequence;

allowing access to said security protected device when each of the fingerprints is validated and said sequence of the fingerprints is validated; and denying access to the security protected device when either any of the fingerprints is not validated nor the input sequence of the fingerprint patterns is not validated.

2. The method according to claim 1, wherein the fingerprints validating step comprises:

comparing each fingerprint with one pre-stored fingerprint.

3. The method according to claim 2, wherein pre-stored fingerprints and pre-stored fingerprint entering sequence are loaded into said security protected device during an enrollment step, wherein said pre-store fingerprints are used for the fingerprints validating step, and said pre-stored fingerprint entering sequence is used for the input sequence validating step.

4. The method according to claim 2, wherein the input sequence validating step comprises:

comparing said input sequence with a pre-stored fingerprint entering sequence.

5. The method according to claim 4, wherein said pre-stored fingerprint entering sequence is loaded into said security protected device during an enrollment step.

6. A method of protecting a secured device comprising steps of an enrollment step and a validation step, said enrollment step comprising:
registering a plurality of individual fingerprints to said secured device; and
providing an entering sequence to said secured device, wherein said entering sequence comprises a combination of at least a portion of said individual fingerprints;

said validation step comprising:
entering a validation sequence of validation fingerprints to said device;
verifying each of the validation fingerprints with said individual fingerprints;
verifying said validation sequence with said entering sequence; and
granting access to the secured device when both verifying steps generate a positive identification.

7. A security protected device, comprising:
a fingerprint recognition device for accepting a plurality of fingerprints, wherein said plurality of fingerprints are entered into the security protected device according to an input sequence;
a validating mechanism for validating each of the fingerprints and said input sequence,
wherein access to said security protected device is granted when each of the fingerprints is validated and said input sequence is validated; and access to the security protected device is denied when either any of the fingerprints is not validated nor the input sequence is not validated.

8. The security protected device according to claim 7, wherein the validating mechanism compares each fingerprint with one pre-stored fingerprint.

9. The security protected device according to claim 8, wherein the pre-stored fingerprints are loaded into said security protected device during an enrollment step.

10. The security protected device according to claim 8, wherein the validating mechanism compares said input sequence with a pre-stored fingerprint entering sequence.

11. The security protected device according to claim 10, wherein said pre-stored fingerprint entering sequence is loaded into said security protected device during an enrollment step.

12. The security protected device according to claim 7 is a computer software.

13. The security protected device according to claim 7 is an electronic equipment.

14. The security protected device according to claim 7 is a data file.

15. The security protected device according to claim 7 is a computer.

16. A method of screening accesses for a security protected device, comprising:
inputting a plurality of biometric patterns, wherein said plurality of biometric patterns are inputted according to an input sequence;
validating each of the biometric templates;
validating the input sequence; and
allowing access to said security protected device when each of the biometric templates is validated and said input sequence is validated.

17. The method according to claim 16, wherein said biometric templates comprise fingerprint pattern.

18. The method according to claim 16, wherein said biometric templates further comprise facial pattern and iris pattern.

19. A security protected device, comprising:
a biometric parameter recognition device for recognizing a plurality of biometric templates, wherein said plurality of templates are provided to the security protected device according to an input sequence;
a validating mechanism for validating each of the biometric templates and said input sequence,
wherein access to said security protected device is granted when each of the biometric templates is validated and said input sequence is validated; and
access to the security protected device is denied when either any of the biometric templates is not validated nor the input sequence of the biometric patterns is not validated.

20. The security protected device according to claim 19, wherein said biometric templates comprise fingerprint pattern.

21. The security protected device according to claim 20, wherein said biometric templates further comprise facial pattern and iris pattern.

* * * * *